United States Patent [19]

Knothe et al.

[11] 4,304,669
[45] * Dec. 8, 1981

[54] DEVICE FOR THE MASS TRANSFER BETWEEN FLUIDS

[75] Inventors: Erich Knothe, Bovenden; Gerhard Lorenz, Krebeck, both of Fed. Rep. of Germany

[73] Assignee: Sartorius GmbH, Fed. Rep. of Germany

[*] Notice: The portion of the term of this patent subsequent to Aug. 26, 1997, has been disclaimed.

[21] Appl. No.: 169,646

[22] Filed: Jul. 17, 1980

[30] Foreign Application Priority Data

Jul. 21, 1979 [DE] Fed. Rep. of Germany ....... 2929655

[51] Int. Cl.³ ............................................. B01D 31/00
[52] U.S. Cl. ................................. 210/321.2; 210/487; 210/493.3
[58] Field of Search ............ 422/48; 210/321.1, 321.2, 210/321.3, 321.4, 321.5, 433.2, 433 M, 487, 493.1, 493.2, 493.3, 493.4, 493.5, 541; 55/497, 500, 521

[56] References Cited

U.S. PATENT DOCUMENTS

| 3,490,523 | 1/1970 | Esmond | 210/321.1 X |
| 3,813,334 | 5/1974 | Bray | 210/487 X |
| 4,113,625 | 9/1978 | Riede | 210/541 X |
| 4,184,962 | 1/1980 | Oscarsson et al. | 210/487 X |
| 4,219,422 | 8/1980 | Knothe et al. | 210/321.1 X |

OTHER PUBLICATIONS

Crescenzi, A.A. et al., "Development of a Simplified Membrane Oxygenator" Trans, Am. Soc. Art. Int. Organs, vol. 5, 1959, pp. 148–156.

Primary Examiner—Charles N. Hart
Assistant Examiner—David R. Sadowski
Attorney, Agent, or Firm—Eric P. Schellin

[57] ABSTRACT

A device for mass transfer between fluids through a diaphragm unit comprising a pair of diaphragms with a diaphragm support therebetween, in which the diaphragm unit is a pleated package supported in a case, with the pleats and support defining a plurality of separate flow paths, and the diaphragm unit is shaped in a direction transverse to the longitudinal axis of the pleats with a zig zag or sine-wave shape, so that a compound zig zag or sine-wave shape results for the unit.

8 Claims, 8 Drawing Figures

DEVICE FOR THE MASS TRANSFER BETWEEN FLUIDS

BACKGROUND OF THE INVENTION

1. Field of the Invention

The invention relates to a device for mass transfer between fluids with interposition of a diaphragm unit consisting of two diaphragms and an intermediary diaphragm support, which diaphragm unit is pleated to a folded package and placed in a box-like enveloping case with inlets and outlets for the fluids, in such a manner that the pleats and the enclosed diaphragm support form several separate parallel flow paths, in which structure the pleats are open in the direction of distribution channels which are arranged rectangularly to the longitudinal pleat edges of the folding package in the case and serve as inlets and outlets for the fluids conveyed in the pleats.

2. Prior Art

Such a device is known e.g. for carrying out an ultrafiltration, from U.S. Pat. No. 3,965,012 and German Utility Model Pat. No. 1,477,779. Furthermore, a dialyzer for the treatment of blood with pleat structure is known (U.S. Pat. No. 3,864,265 and U.S. Pat. No. 4,028,252) wherein a diaphragm together with a diaphragm support are jointly pleated in the form of a grid system to a folding package. In this case, the two separate flow paths serve to convey the dialysate and the blood.

In filtration units for the treatment of blood, it is also basically known to use in flat diaphragms of hose-like or plate-like shape a fabric as the diaphragm support (U.S. Pat. No. 3,579,441 and German Offenlegungsschrift No. 2,653,875).

Furthermore, in dialyzers of coil structure or plate structure, it is known to use stamped foils of plastic material as the diaphragm support (German Offenlegungsschrift No. 2,747,904, corresponding to U.S. Application Ser. No. 742,359 now U.S. Pat. 4,115,273, Winstead; U.S. Pat. No. 3,738,813; U.S. Pat. No. 3,490,523; U.S. Pat. No. 3,362,540; and U.S. Pat. No. 3,960,730). The bilaterally arranged stampings form a multiplicity of punctiform or linear supports for the diaphragm and are furthermore arranged in a structure that favors the fluid flow of the fluids to be treated in the proper direction.

The invention relates also to a further development of the patent rights of the applicant according to U.S. Patent Application Ser. No. 6,384 now U.S. Pat. No. 4,219,422 and German Utility Model Patent Offenlegungsschrift No. 2,013,105.

Such pleat dialyzers are well suited for industrial manufacture since they are produced from endless material, namely of the diaphragm and the diaphragm support, by parallel pleating, and in this manner relatively small devices, i.e. filter elements, can be made.

Such filter elements should ideally absorb a relatively small blood volume, they should permit a uniform distribution of the blood flow over the diaphragm, they should offer the smallest possible resistance to flow on the blood side, present a high dialyzing efficiency, a good ultrafiltration rate, a compact structure, and their cost of manufacture should be low.

The latter fact is particularly important since these filter elements, after having been used once, are thrown away for safety reasons when they are, according to their purpose, employed as an artificial kidney.

The known filter elements manufactured according to the pleating principle need improvement insofar as the blood distribution from the side into the pleat depth and the further conveyance of the blood in the longitudinal direction, i.e. parallel to the pleats, is still too uneven and therefore no uniform blood film thickness over the entire area of the diaphragm can be achieved. Besides, in the case of employment of a simple fabric in binding cloth or of a non-interwoven network, the resistance to flow resulting therefrom is still too great.

SUMMARY OF THE INVENTION

The purpose of the invention is therefore the improvement, by simple means, of a device for mass transfer between fluids, with interposition of a diaphragm unit consisting of pleated diaphragm placed in a support to define separate flow channels and inlets and outlets for the fluids.

This purpose is achieved according to the invention by making the diaphragm support with a zig zag wave shaped sine-wave cross section transverse to the parallel flow paths, and shaping the thus formed suppot with a zig zag shaped sine-wave shape in the parallel direction.

BRIEF DESCRIPTION OF THE DRAWINGS

The invention is explained in greater detail with the aid of the accompanying drawings, wherein:

FIG. 1a is an enlarged detail section of the pleating of FIG. 1;

DETAILED DESCRIPTION OF THE PREFERRED EMBODIMENTS

Figure 1:
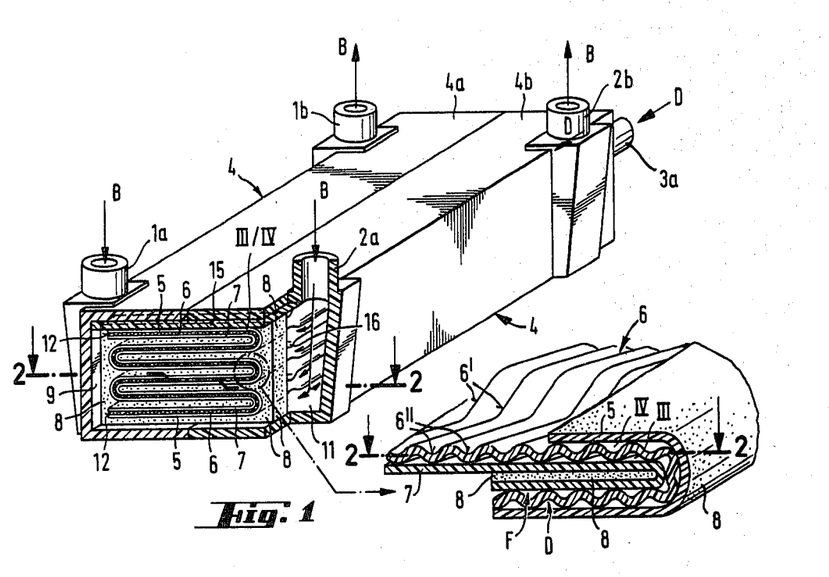
FIG. 1 is a perspective view with the front side of the case broken away along the cutting line 1—1 in FIG. 2.
Figure 2:
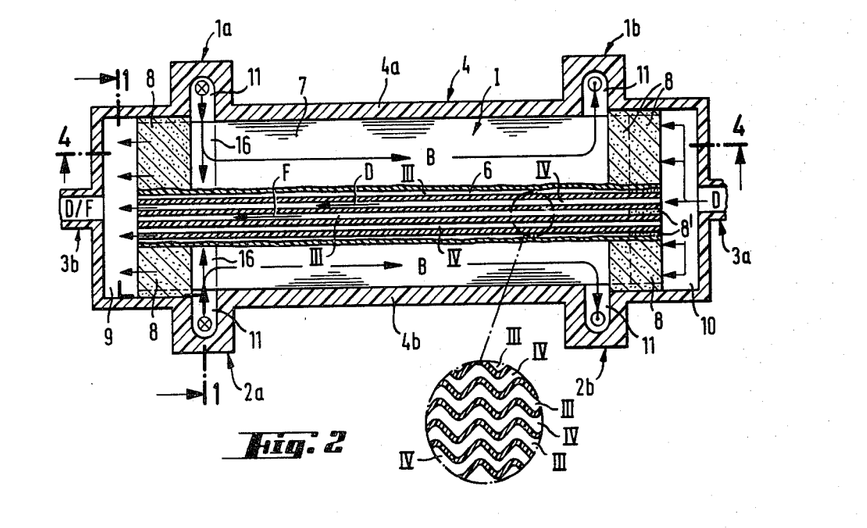
FIG. 2 is a horizontal section through the filter along the cutting line 2—2 in FIG. 1.

According to FIG. 1, the filter consists of a box-like case 4 of two half shells 4a, 4b, provided on its topside with a first inlet 1a and a first outlet 1b for the blood B, and on the opposite side a second inlet 2a and a second outlet 2b for the blood B, as well as on the front side with an inlet 3a for dialysate D and an outlet 3b for the dialysate and/or filtrate D/F. As shown in FIGS. 1 and 2, inlets and outlets 1a, 2a, 1b, 2b for the blood form in case 4 downward directed distribution channels 11.

In the box-like case 4, the separating device proper is arranged in the form of a folded or pleated package, consisting of two diaphragms 5 and 7 and a diaphragm support 6 enclosed thereby. These three superposed layers, namely diaphragm 5, diaphragm support 6, and diaphragm 7, are jointly pleated according to FIG. 3 after fixation of the endless paths on the edges, and compressed to a folded package adjusted to the height of the case. In the pleating, the terminal areas are pasted on the front sides of the pleat grooves with a bead of synthetic resin plastic 8, so that only at the front side the hose-like flow path of the diaphragm support 6 remains open.

For the formation of the three flow paths I, II, III, not only the terminal area of the folding package is provided with a pasting 8 or sealing which abuts according to FIG. 2 tightly on all sides against case 4 and thus seals the distribution space 9 and 10 for the dialysate against the rest of the case 4, but the two longitudinal edges of the terminal pleats 12 are likewise provided, over the whole length, with a packing pasting 8 or sealing, so that the folding package is open on both front sides only in the area of the central position, which means the diaphragm support 6.

For the purpose of better flow conveyance, diaphragm support 6 is provided relative to the parallel flow paths) with a transversally extending, zig zag shaped to sine-wave shaped cross section structure of wave crests and wave troughs, in which structure the wave backs 6' and wave grooves 6" extending in the direction of the parallel flow paths have a zig zag shaped to sine-wave shaped transverse displacement, i.e. wave backs 6' form a common reference plane, and wave grooves 6" form likewise a common reference plane, the two planes extending in the widest sense parallel but in zig zag shaped to sine-wave shape.

Figure 5:
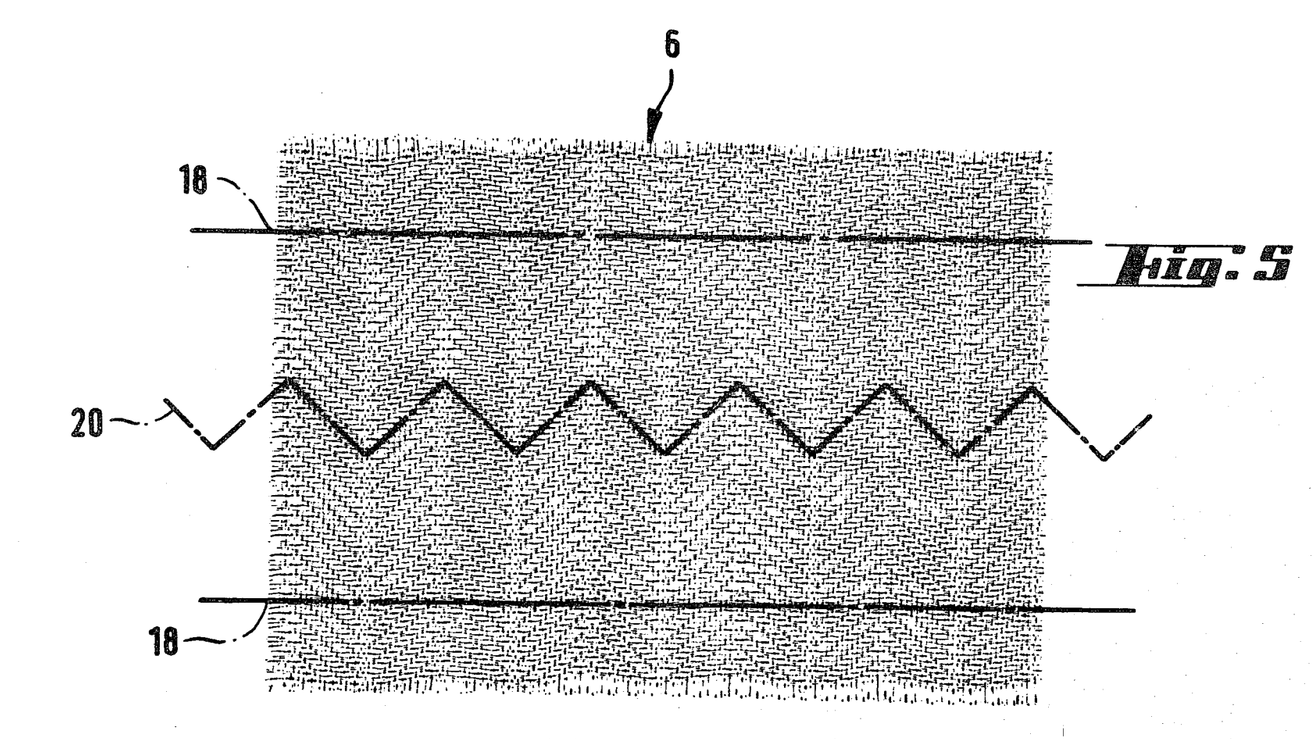
FIG. 5 is a plan view upon a fabric in zig zag twill or point twill binding.
Figure 5A:
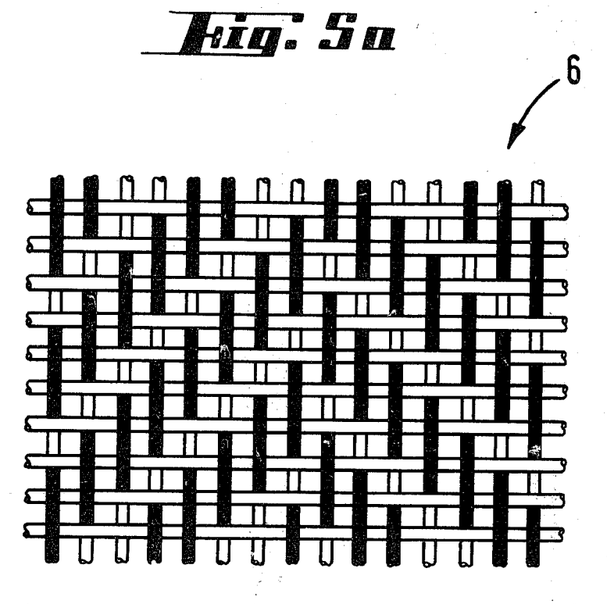

This structure can, according to the invention, be achieved by shaping a plastic material fabric in the structure and binding mode of a twill, especially a fishbone twill or a zig zag twill (point twill) according to FIG. 5 and pleating it as a diaphragm support 6 jointly with the two diaphragms 5 and 7. By this structure, a defined flow direction is produced and furthermore the result if assured that in the pleating on top of each other the elevations from the diaphragm support of one pleat are not pressed into the recesses of the diaphragm support of the other pleat. The various twill binding modes are known in textile technology and also in sifting technology and need therefore no additional description or representation for the present employment.

In another embodiment, according to the invention the diaphragm support 6 consists of a fluid-tight foil, as is diagrammatically indicated in the detail section according to FIG. 1.

When as diaphragm 6 a fabric of monofil plastic material threads is used in fishbone twill binding or zig zag twill binding, the two diaphragms 5 and 7 form therefore in connection with diaphragm support 6 an open hose extending in longidutinal direction of the case and open in the area of distribution chamber 9 and 10 and thus form the flow chamber III.

Figure 3:
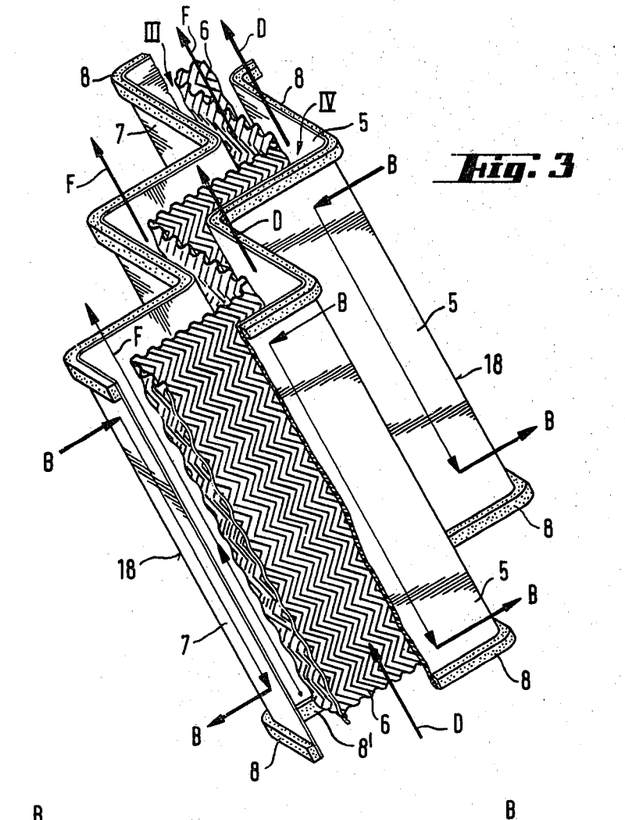
FIG. 3 is an enlarged perspective view of the pleaded unit sharing the flow conveyance on the diaphragm and the diaphragm support.
Figure 4:
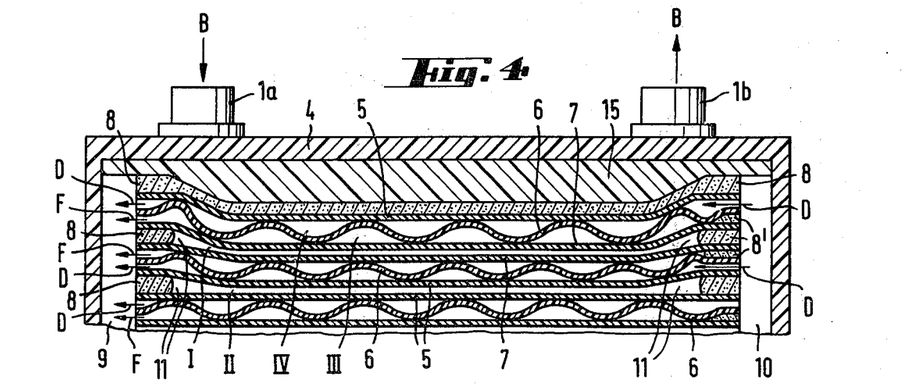
FIG. 4 is an enlarged section along the line 4—4 in FIG. 4.

The pasting and packing bead 8' shown in FIGS. 2 to 4 is in this case absent. The construction, with the exception of the used fabric in twill binding, corresponds therefore to the device according to the initially mentioned U.S. and G.B. patent applications of the applicant. The same applies when in place of the fabric in twill binding mode, a stamped foil of plastic material is used, as is shown in the detail of FIG. 1a and in FIG. 3. The fluid flow from the distribution chamber 10 to the distribution chamber 9 is therefore divided by means of the foil only into a partial flow which sweeps over diaphragm 5 and over diaphragm 7. The foil need therefore not be fluid-tight.

The other two flow chambers I and II are formed in that the longitudinal edges of the folding package abut, in the area between the inlets and outlets 1a, 2a, 1b, 2b, tightly against the longitudinal walls of case 4, and the top and bottom side of the folding package abut tightly against the bottom and ceiling of the case. The blood introduced in inlets 1a and 2a passes via distribution channels 11 to the area of the individual pleat grooves which are open toward each of the associated longitudinal case walls, and it is forced, according to FIG. 2, to penetrate into the past depth and to flow in the direction of the outlet 1b, 2b concerned.

In the present embodiment, therefore, the blood introduced in inlet 1a passes through flow chamber I and departs therefrom through outlet 1b, while in the same manner the blood introduced in the second inlet 2b departs through outlet 2b from flow chamber II. Preferably in the countercurrent process the dialysate passes through flow chamber III through inlet 3a and through distribution chamber 10 through case 4 in the direction of distribution chamber 9 and departs therefrom through outlet 3b.

On the basis of the concentration drop between blood and dialysate, the substances to be eliminated as urine and to be removed from the blood diffuse through diaphragm 5 and 7 into the hollow space supported by diaphragm support 6 and are discharged therefrom. When a vacuum pump is connected with outlet 3b for the dialysate and the flow through inlet 3a for the dialysate is throttled or entirely blocked by means of a hose clip, an ultrafiltration from the blood side to the dialysate side takes place on the basis of the pressure drop. In this manner, larger amounts of blood water can be removed from the blood within a short time.

Simultaneous hemodialysis and hemofiltration can be optimized even further by combining, instead of two diaphragms of the same type, a special dialysis diaphragm with a special filtration diaphragm. Thus, e.g., a dialysis diaphragm on the basis of cellulose hydrate can be combined with an asymmetrical ultrafiltration diaphragm on the basis of cellulose triacetate.

A further optimization becomes possible by ensuring the result that the dialysate comes in contact with the dialysis diaphragm only and the filtrate is discharged in a separate flow path from the filtration diaphragm, in which case it is customary to discard jointly the consumed dialysate and the filtrate. To this extent, a separate collection of the filtrate is not compulsory.

For this purpose, the flow chamber common in the use of a fabric of the weaving type above described, is in the diaphragm support 6 once more subdivided, according to detail point FIG. 1 and FIG. 3, into a flow path III for the filtrate and a flow path IV for th dialysate.

Flow path III for the filtrate is therefore formed by filtration diaphragm 7 and diaphragm support 6 on the one hand, and flow path IV for the dialysate is formed by dialysate diaphragm 5 and diaphragm support 6 on the other hand, namely in such a way that both front sides of the folding package are provided with a lamellar seal 8 of the two superposed diaphragms 5,7 in the pleats and a seal 8' of the filtration diaphgram 7 with the side of diaphragm support 6 that faces it is provided on the front side only wherein the dialysate enters on the front side between the dialysis diaphragm 5 and the side of diaphragm support 6 that faces it, while the opposite front side of the folding package in the plane of diaphragm support 6 is open for the discharge of the dialysate and filtrate.

According to FIGS. 2, 3 and 4, this means that in the area of distribution chamber 10 the filtration diaphragm 7 is tightly pasted with the aid of a pasting bead 8' together with the side of diaphragm support 6 that faces it, and thus flow path III for the filtrate is closed on the dialysate inlet side and on the dialysis outlet side. Dialysate and filtrate are therefore jointly discharged from distribution chamber 9 and discarded.

FIG. 3 clarifies the conveyance of the fluids in a multiplicity of parallel zig zag shaped flow paths. If such a zig zag shaped flow path is cut according to FIGS. 1 or 3, respectively, diaphragm support 6 appears in the longitudinal section representation according to FIG. 4 as a cut wave.

In the diagrammatically simplified partial longitudinal section according to FIG. 4, a pressure plate 15 is inserted between the top diaphragm surface and case 4 on the one hand, and suitably also betwen the bottom diaphragm surface and case 4. This pressure plate 15 compresses the folded package in the area between distribution channels 11 to a rated size, so that the surfaces of diaphragms 5,7 in the first place extend parallel and in the second place a defined channel height in the pleat grooves is achieved. When the chosen strength of the adhesive 8, 8' is somewhat greater on the front sides, for the sealing of the pleat grooves against distribution chambers 9 and 10, than the desired channel height in the pleat grooves, the resulting channel heights in the area of distribution channels 11 are somewhat greater. The result thereof consists in that the fluid, e.g. blood, conveyed therein can better penetrate the pleat depth.

In the use of a grid system it is already known (U.S. Pat. NO. 4,028,252) to deform the grid structure thermoplastically in a groove-like manner in the area of the lateral inlets of a dialyzer in a pleat structure on both sides, so that the diaphragm covering the grid system bags in the area of the inlet channels more strongly than in the rest of the area. The fluid introduced in the pleat grooves is to penetrate the pleat depth more readily, and a uniform distribution over the entire diaphragm area is to take place. This kind of deformation causes in grid systems sharp-edged projections since the monofil threads of the grid system are practically spread-rolled to a foil. A flow conveyance for the dialysate from front side to front side of the folding package is thus impossible. The danger of damaging the diaphragm is furthermore increased in this manner.

Figure 6:
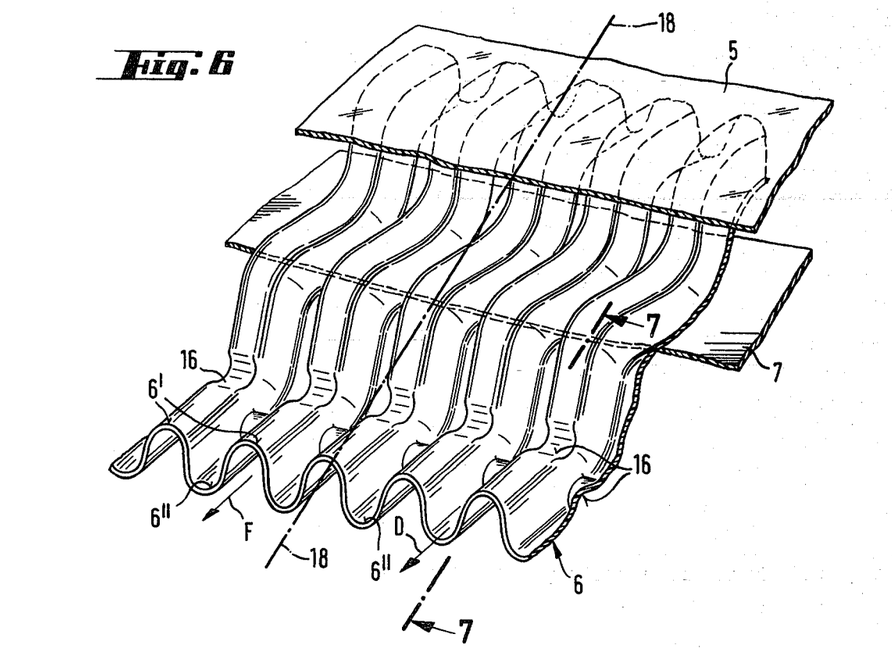
FIG. 6 is a perspective view upon a stamped foil, showing the compound zig zag shape.
Figure 7:
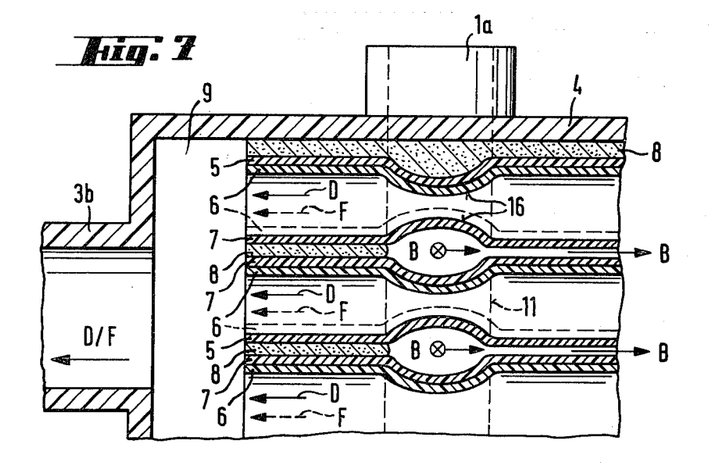
FIG. 7 is a detail section through several pleat layers in the area of the distribution space, taken along the indicated cutting line 7—7 in FIG. 6.
Figure 8:
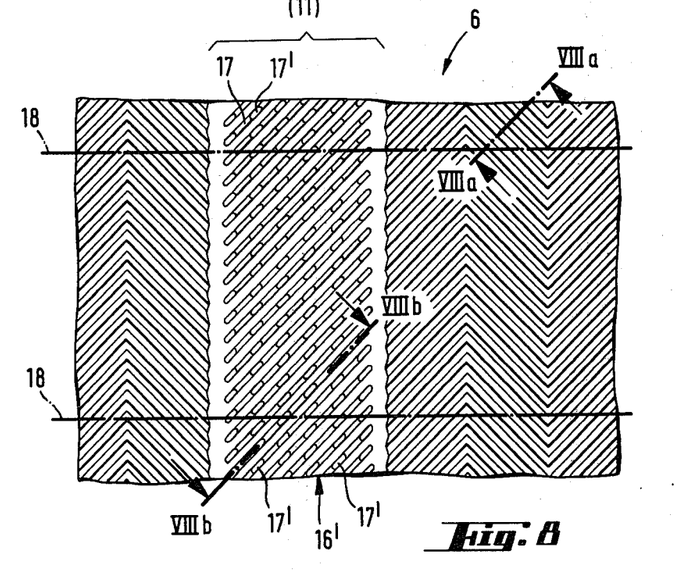
FIG. 8 is a plan view of another embodiment of the stamped foil in the area of a distribution channel.
Figure 8A:
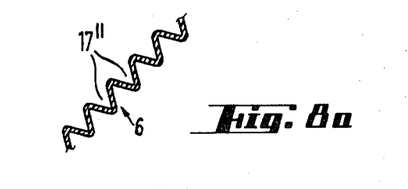
FIG. 8a is a cross sectional view of the foil in FIG. 8.
Figure 8B:
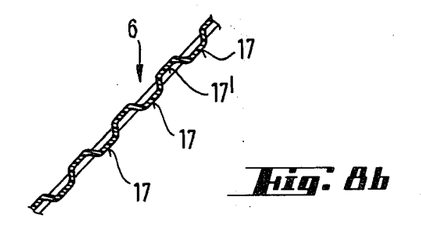
FIG. 8b is a cross sectional view of the foil in FIG. 8.

According to the invention, in the use of a stamped foil as the diaphragm support, the wave structure is provided in the area of distribution channels 11 on both sides with a molded-in transverse channel 16, i.e., the wave backs 6' in the area of inlet channels 11 are bilaterally compressed by about ⅓ of the width of these inlet channels as shown in FIGS. 6,7, or the transverse channel 16' is formed according to FIG. 8, by the device that the wave structure is replaced in the area of inlet channels 11 by a multiplicity of individual elevations 17 and individual recesses 17'. This structure permits on the one hand a good and uniform distribution of the fluid from distribution channels 11 into the pleat depth of the individual pleats of diaphragms 5,6, and on the other hand does not obstruct the fluid flow on the diaphragm support itself. The embodiment of transverse channels 16, 16' according to FIGS. 6 and 8 is employed when in the pleat stack there is not already a widening of the interspaces in the area of inlet channels 11 analogously to the illustration in FIG. 4. In all cases, transverse channels 16, 16' extend rectangularly to the pleat edges marked 18 of diaphragm 5,7 and of diaphragm support 6.

The advantage of the embodiments of the invention consists in that with the aid of a standard case a multiplicity of modification possibilities in the area of mass transfer between fluids with insertion of a diaphragm unit have been created, in which embodiment on the basis of three-layer pleat material at small case dimensions relatively large exchange areas for the conveyed fluids are present.

The device described as dialyzer and/or filter can be used analogously as oxygenator for the oxygen enrichment of blood if a suitable diaphragm is employed. Likewise, the device can also be used for the separation of milk content materials if the device is provided with diaphragms suited therefor.

What we claim as new and desire to secure by United States Letters Patent is:

1. A device for mass transfer between fluids, comprising:
    a box-like case with inlets and outlets for the fluids;
    a diaphragm unit consisting of two semipermeable diaphragms and an intermediary diaphragm support provided with flow channels, which diaphragm unit is pleated to a folded package and placed in the box-like case in such a manner that pleats are formed in the diaphragm unit and the enclosed diaphragm support form several separate parallel flow paths, distribution channels arranged around the edges of the pleats of the diaphragm unit, which distribution channels serve as inlets and outlets for fluids conveyed in the pleats, the pleats being open in the direction of the distribution channels;
    the diaphragm support presenting a zig-zag-wave shaped sine-wave shaped cross section structure extending transversely to the parallel flow paths, and having wave crests and wave troughs; and
    wave backs and wave grooves of the pleated structure extending in the direction of the parallel flow paths to present a zig zag shaped to sine-wave shaped displacement transverse to the parallel flow paths.

2. A device as in claim 1, wherein:
    the diaphragm support consists of a plastic material fabric of monofils in the binding mode of a fishbone twill or a zig zag twill (point twill); and
    the wave backs and wave troughs of the flow channels are formed by the bone extending in zig zag shape of the binding points of the fabric.

3. A device as in claim 1, wherein:
    the diaphragm support consists of a stamped foil of plastic material.

4. A device as in claim 1 or 3, wherein:
    the wave backs are provided, in the area of the lateral distribution channels on both sides with a molded-in transverse channel, which channels extend approximately perpendicularly to the wave backs.

5. A device as in claim 1 or 3, wherein:
    transverse channels are formed by the wave backs in the area of the distribution channels being bilaterally compressed to about ⅓ of the wave height.

6. A device as in claim 1 or 3, wherein:
    transverse channels are formed by a multiplicity of individual elevations and individual recesses which interrupt the wave structure in the area of the inlet channels.

7. A device as in claim 1, 2 or 3, wherein:

the diaphragm support consists of a stamped foil enclosed in a sandwich-like manner between two diaphragms, pleated jointly to a folded package in such a way that by the pleats there are formed on each pleat side in each case a first and second separate flow chamber provided with an inlet and an outlet;

between the diaphragm support and the two diaphragms two further flow paths are formed;

both front sides of the folding package are provided with a lamellar packing of the two superposed diaphragms, in the pleats and the opposite front sides of the folding package are open in the plane of the diaphragm support for the entry and discharge of a fluid, in which structure both front sides of the folding package terminate each in a distribution chamber sealed against the two first flow chambers with connections.

8. A device as in claim 1, 2 or 3, wherein:

the diaphragm support is formed from a fluid-tight stamped foil and is enclosed in a sandwich-like manner between a filtration diaphragm and a dialysis diaphragm and it is pleated jointly therewith to a folded package in such a manner that there is formed by the pleats on each pleat side in each case a first and second flow chamber provided with an inlet and outlet and that between the diaphragm support and the filtration diaphragm on the one hand a flow path for the filtrate and between the diaphragm support and the dialyses diaphragm on the other hand a further flow path for the dialysate is formed; and both front sides of the folding package are provided with a lamellar packing of the two superposed diaphragms in the folds, and a packing of the filtration diaphragm with the side facing it of the diaphragm support is provided only on that front side on which the dialysate enters on the front side between the dialysis diaphragm and the side facing it of the dialysis support and in a manner deviating therefrom the opposite front side of the folded package is open in the plane of the diaphragm support for the discharge of the dialysate and filtrate, in which structure both front sides of the folded package terminate each in a distribution chamber with connections.

* * * * *